United States Patent Office 3,406,116
Patented Oct. 15, 1968

3,406,116
ABRASIVE DETERGENT COMPOSITIONS
Peter T. Vitale, Fresh Meadows, N.Y., assignor to Colgate-Palmolive Company, Jersey City, N.J., a corporation of Delaware
No Drawing. Filed Mar. 2, 1956, Ser. No. 568,986
6 Claims. (Cl. 252—99)

The present invention relates to new substantially dry abrasive cleansers in particulate form. More particularly it relates to such cleansers which possess improved cleansing and metal polishing properties.

For many years it has been customary to use abrasive cleansers in the household for cleansing of glazed porcelain and other vitrified surfaces. These same cleansers have, to a certain extent, been used for cleansing and polishing metalware such as tarnished copper pot bottoms. However the previously available abrasive cleansers have been relatively unsatisfactory for metal polishing as they rely substantially completely on a mechanical abrasive action for their efficacy.

An abrasive cleanser has now been discovered which not only exhibits improved cleansing of glazed ceramic surfaces but which also is characterized by the ability rapidly and easily to cleanse and polish tarnished metal surfaces.

In accordance with the present invention an essentially dry abrasive cleanser in particulate form consists essentially of a major proportion of water insoluble inorganic siliceous abrasive material, a heterocyclic N-chloro imide, and an organic detergent compound stable in the presence of said imide.

The abrasive agents of the scouring cleansers of the present invention are well known in the art and include siliceous materials such as silica, feldspar, pumice, vulcanic ash, diatomaceous earth, bentonite and talc, and mixtures thereof. The abrasives may vary in hardness and particle size, and the choice for a particular composition is generally dependent upon the contemplated field of application. The mesh size of the particles may vary from about 40 to about 400 generally. Thus, while a mesh of about 40–80 may be suitable for manufacturing a scouring powder for tile and ceramic floors, it would not be suitable for fine marble or glassware which would require a scratchless abrasive of about 200 mesh. For general use, it is preferred to use either silica or feldspar of various degrees of fineness for they are relatively hard and result in a whiter product. These abrasives should be usually at least 100 mesh and preferably at least 200 mesh for the major part of the composition.

The concentration of abrasive is at least about 50%, and preferably at least about 60 to about 95% by weight of the cleanser.

The heterocyclic N-chloro imides of the composition of the present invention are cyclic imides having from 4 to about 6 members in the ring, and are characterized by the following structure:

in which the electron donating nitrogen is doubly activated to a highly acidic state by virtue of its proximity to two electropositive carbonyl groups. Such N-chloro imides are known to the prior art, usually being prepared by passing chlorine gas into an alkaline aqueous solution of the parent imide. Compounds suitable for use in the present compositions include the N-chloro derivatives of cyanuric acid (e.g. mono-, di-, and trichlorocyanuric acid) and hydantoin as well as N-chloro succinimide, N-chloro malonimide, N-chloro phthalimide and N-chloro naphthalimide. In general it is preferred to employ those imides containing a plurality of chlorine-carrying nitrogen atoms, e.g. trichlorocyanuric acid, dichlorocyanuric acid, and the N-chloro hydantoins. Suitable N-chloro hydantoins include 1,3-dichloro-5,5-dimethylhydantoin;
N-monochloro-C,C-dimethylhydantoin;
methylene-bis-(N-chloro-C,C-dimethylhydantoin);
1,3-dichloro-5-methyl-5-isobutylhydantoin;
1,3-dichloro-5-methyl-5-ethylhydantoin;
1,3-dichloro-5,5diisobutylhydantoin;
1,3-dichloro-5-methyl-5-n-amylhydantoin;

and the like. Especially preferred is trichlorocyanuric acid, which, in one tautomeric configuration, is characterized by three N-chlorinated imide linkages.

These N-chloro imides, when compounded in the instant compositions, produce novel abrasive cleansers of long shelf life which, when slurried with water for use, possess unusually high detersive and metal polishing power, as well as oxidizing, sterilizing and germicidal properties. The N-chlorinated imides are highly effective in relatively small amounts, normally comprising about 0.1 to 10% and preferably about 0.2 to 5% of the total composition.

The third essential ingredient of the present novel abrasive cleansers is an organic detergent which is stable in the present of the contemplated N-chloro imides. These organic detergents may be anionic, cationic, or non-ionic in character. Where they are liquids under normal conditions, such as the non-ionic agents generally, they may be prepared in particulate solid form after adsorption upon diatomaceous earth or other similar agents in procedures well known in the art.

As examples of suitable anionic detersive compounds contemplated within the ambit of the invention are the soaps and the sulfated and sulfonated synthetic detergents, especially those anionic detergents having about 8 to about 26 and preferably about 12 to about 22 carbon atoms to the molecule. The soaps are generally the water soluble salts of saturated higher fatty acids and mixtures thereof.

The sulfated and sulfonated detersive compounds are also well known in the art and may be prepared from suitable organic materials which are applicable to sulfonation ("true sulfonation and/or sulfation"). Of the vast variety of sulfates and sulfonates suitable, it is preferred to use the aliphatic sulfates and sulfonates of about 8 to 22 carbon atoms and the alkyl aromatic sulfonates.

The alkyl aromatic sulfonate detergents referred to may be mononuclear or polynuclear in structure. More particularly, the aromatic nucleous may be derived from benzene, toluene, xylene, phenol, cresols, phenol ethers, naphthalene, derivatives of phenanthrene nuclei, etc. It has also been found that the alkyl group may vary similarly. Thus, for example, the alkyl group may be straight or branch chained and may consist of such radicals as dodecyl, pentadecyl, octyl, nonyl, decyl, keryl, mixed alkyls derived from fatty materials, cracked paraffin wax olefines, and polymers of lower mono olefines, etc. While the number of sulfonic acid groups present on the nucleus may vary, it is usual to have only one such group present in order to preserve as much as possible a balance between hydrophilic and hydrophobic portions of the molecule.

More specific examples of suitable alkyl aromatic sulfonate detergents are the propylated naphthalene sulfonates, the mixed butyl naphthalene sulfonates, tetrahydronaphthalene sulfonates, the various butylated diphenyl sulfonates and phenylphenol sulfonates. It is preferred, however, to use the higher alkyl aromatic sulfonates rather than the lower alkyl substituted detergents. Typical examples of this preferred class are the sulfonated and alkylated benzene type compounds wherein the alkyl group is at least 8 and preferably about 10 to about 16 carbon atoms. The benzene ring may possess other substituents including alkyl and hydroxy groups.

Other suitable agents are the surface-active sulfated or sulfonated aliphatic compounds, preferably having 8–22 carbon atoms. Within the scope of such definition are the sulfuric acid esters of polyhydric alcohols incompletely esterified with higher fatty acids, e.g. coconut oil monoglyceride monosulfate, tallow diglyceride monosulfate; the long chain pure or mixed alkyl sulfates, e.g. lauryl sulfate, cetyl sulfate; the hydroxy sulfonated higher fatty acid esters, e.g. higher fatty acid esters of low molecular weight alkylol sulfonic acids, e.g. fatty acid esters of isethionic acid; the fatty acid ethanolamide sulfates; the fatty acid amides of amino alkyl sulfonic acids, e.g. lauric amide of taurine, and the like. More particularly, it is preferred to use the sulfated aliphatic compounds containing at least about 8 carbon atoms, especially those having 12 to about 22 carbon atoms to the molecule.

As suitable cationic detergents there may be noted the long chain alkyl quaternary ammonium compounds, e.g. cetyl quaternary ammonium salts. Within this group are included those salts wherein the nitrogen atom may be part of an open chain or heterocyclic structure such as cetyl tri-methyl ammonium chloride and cetyl pyridinium chloride. Another equivalent cationic agent is the diethylene amino ethyl oleyl amide product.

The non-ionic agents are also well known in the art including the polyoxyethylene ethers of alkyl aromatic hydroxy bodies (e.g. the alkylated polyoxyethylene phenols), the polyoxyethylene ethers of long chain aliphatic alcohols, and the polyoxyethylene ethers of hydrophobic propylene oxide polymers.

The anionic and cationic surface active agents are commonly used in the form of their water soluble salts. For the synthetic anionic compounds, the alkali metal (e.g. sodium, potassium) and ammonium salts are preferred, though other salts such as amine, alkylolamine, alkaline earth metals (e.g. calcium, magnesium) salts may be used if desired. For the cationic agents the chloride, sulfate, acetate, and like salts may be employed satisfactorily.

The amount of organic detergent to be used in the present compositions is from about 0.5% up to about 15% by weight, and preferably from about 2% to about 10%. Commercial detergent compositions in which these organic detergents are the active ingredients and are compounded with other materials including sodium sulfate, the various phosphates, etc. may be employed with satisfactory results.

It is common to employ various adjuvant materials in abrasive detersive compositions. These additives may be inorganic or organic in structure and may be included in compositions of the present invention. Inorganic water soluble alkaline builders such as the alkali metal carbonates, bicarbonates, phosphates (e.g. trisodium phosphate, tetrasodium pyrophosphate, sodium tripolyphosphate) silicates and borates may be added in any suitable amounts, usually up to about 25% and preferably up to about 15%. Similarly, there may be employed minor amounts of wood pulp, sawdust, magnesite, whiting, sodium carboxymethylcellulose, anti-caking agents, optical brighteners, etc.

The following examples are illustrative of the present invention and it will be understood that the invention is not limited thereto.

EXAMPLE I

A series of similar abrasive cleansers are prepared by incorporating trichlorocyanuric acid in place of part of the silica in a control cleanser consisting of:

Constituent: Parts by weight
 Silica _____ 89.5
 Sodium dodecyl benzene sulfonate _____ 3.5
 Inorganic salts (sodium sulfate, pentasodium
  tripolyphosphate and sodium silicate) ____ 7.0

The various compositions are prepared by dry mixing, and are then tested for their ability to polish copper plates, which have been tarnished by 15 minutes exposure in an oven to a temperature of 235° C. The test is carried out by applying a uniform amount (6 grams) of a mixture of 33 parts of the abrasive cleanser and 67 parts of water (at room temperature) to a sponge which is inserted in a mechanism which reciprocally rubs the sponge (under a fixed load) on the surface of a tarnished plate. After each 100 strokes, the mechanism is stopped, the sponge is rinsed in fresh water and reloaded with abrasive slurry, and the plate is flushed with water and inspected visually. The end point is reached when the rubbed area appears to the observer to be completely polished (non-uniform polishing at the edges of the polished area and streaks caused by uneveness of the sponge or the plate are neglected). The number of strokes required to reach the end point is reproducible to within the 100 stroke increments normally employed. The increase in reflectance of the copper plate on polishing is determined by means of a gloss meter. The results of these tests (averaged values obtained for 3 gloss readings on each of 3 test plates) appear in the table below.

TABLE

| Trichlorocyanuric Acid Percent by weight | No. of Strokes Required to Polish | Increase in Percent Gloss [1] (Polished minus Unpolished) |
| --- | --- | --- |
| 0 | 600 | 20 |
| 0.25 | 500 | 20 |
| 1.0 | 300 | 25 |
| 3.0 | 300 | 30 |
| 5.0 | 200+ | 40 |

[1] Polished stainless steel mirror equals 100%.

A similar composition containing 5% by weight of sodium perborate but no imide requires an average of 600 strokes to polish the tarnished copper plates. A negligible increase in gloss is observed.

EXAMPLE II

An abrasive cleansing composition is prepared by dry mixing approximately 80 parts of silica, 3.5 parts of sodium dodecyl benzene sulfonate, 10.1 parts of inorganic salts, and 6.4 parts of 1,3 dichloro 5,5 dimethyl hydantoin. This composition, when mixed with water, cleans glazed ceramic tiles about 10% faster than does a control composition which is identical with the exception that it lacks the chlorinated hydantoin. The hydantoin-containing cleanser is also considerably more effective in cleansing and polishing metal surfaces than is this control.

EXAMPLE III

A satisfactory abrasive cleanser is prepared by dry mixing:

| | Parts by weight |
|---|---|
| Feldspar | 90.7 |
| Trisodium phosphate | 0.4 |
| Sodium chloride | 0.1 |
| Sodium carbonate | 0.6 |
| Soap | 3.2 |
| N-chloro succinimide | 5.0 |

The feldspar may be replaced with any of the aforementioned siliceous abrasives, and the soap may be replaced by any of the previously referred to detergents.

EXAMPLE IV

An abrasive cleanser which rapidly removes tarnish and stains from copper and other metal utensils consists of:

| | Parts by weight |
|---|---|
| Silica | 88.92 |
| Sodium dodecyl benzene sulfonate | 3.55 |
| Inorganic salts (sodium sulfate, pentasodium tripolyphosphate and sodium silicate) | 7.00 |
| Dichlorocyanuric acid | 0.25 |
| Melamine | 0.20 |
| Perfume | 0.08 |

Although the present invention has been described with reference to particular embodiments and examples, it will be apparent to those skilled in the art that variations and modifications of this invention can be made and that equivalents can be substituted therefor without departing from the principles and true spirit of the invention.

What is claimed is:

1. A substantially dry abrasive scouring powder highly effective in cleansing soiled ceramic surfaces and in polishing tarnished copper surfaces consisting essentially of at least about 50% by weight of a water insoluble inorganic siliceous abrasive material having a particle size of from 40 to 400 mesh, about 0.1 to 10% by weight of a heterocyclic N-chloro imide, and about 0.5 to 15% by weight of an organic detergent compound stable in the presence of said imide.

2. A substantially dry abrasive scouring powder as set forth in claim 1 which contains from about 0.1 to about 10% by weight of trichlorocyanuric acid.

3. A substantially dry abrasive scouring powder as set forth in claim 1 which contains from about 0.1 to about 10% by weight of dichlorocyanuric acid.

4. A substantially dry abrasive scouring powder as set forth in claim 1 which contains from about 0.1 to about 10% by weight of 1,3-dichloro 5,5-dimethyl hydantoin.

5. A substantially dry abrasive scouring powder highly effective in cleansing soiled ceramic surfaces and in polishing tarnished copper surfaces consisting essentially of:

| | Percent by weight |
|---|---|
| Silica (having a particle size of from 40 to 400 mesh) | 60–95 |
| Dichlorocyanuric acid | 0.2–5 |
| Alkyl benzene sulfonate | 2–10 |
| Inorganic water-soluble alkaline builder salts | up to 25 |

6. A substantially dry abrasive cleaner composition consisting essentially of:

| | Percent |
|---|---|
| Silica flour | about 81 |
| Organic sulfonate detergent | do 4 |
| Inorganic water-soluble alkaline and neutral builder salts | do 14 |
| Dichlorocyanuric acid | do 1 |

References Cited

UNITED STATES PATENTS

| | | | |
|---|---|---|---|
| 1,613,448 | 1/1927 | Endres et al. | 252—187 |
| 2,393,866 | 1/1946 | Wassell | 252—155 X |
| 2,422,255 | 6/1947 | Peters | 252—187 |
| 2,430,233 | 11/1947 | Magil | 252—187 |
| 2,501,145 | 3/1950 | Smith | 252—99 |
| 2,578,270 | 12/1951 | Strain | 252—187 |
| 2,607,738 | 8/1952 | Hardy | 252—99 |
| 2,090,932 | 8/1937 | Blessing | 252—155 |
| 1,881,506 | 10/1932 | Gray | 252—140 |
| 2,275,049 | 3/1942 | Keller | 252—140 |
| 2,296,690 | 9/1942 | Soderberg | 252—140 X |
| 2,468,448 | 4/1949 | King | 252—140 |
| 2,489,848 | 11/1949 | Bacon et al. | 252—140 X |

OTHER REFERENCES

Proceedings Chem. Specialties Manufactures Assn., Dec. 8 and 9, 1952, p. 126, 252–99.

LEON D. ROSDOL, *Primary Examiner.*

M. WEINBLATT, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,116            October 15, 1968

Peter T. Vitale

It is certified that error appears in the above identified patent and that said Letters Patent are hereby corrected as shown below:

Column 1, before line 9, insert -- This application is a continuation-in-part of co-pending application Serial No. 502,751, filed April 20, 1955, now abandoned. --.

Signed and sealed this 29th day of July 1969.

(SEAL)
Attest:

Edward M. Fletcher, Jr.            WILLIAM E. SCHUYLER, JR.
Attesting Officer                     Commissioner of Patents